US 6,648,651 B1

(12) United States Patent
Cadman et al.

(10) Patent No.: US 6,648,651 B1
(45) Date of Patent: Nov. 18, 2003

(54) APPARATUS FOR CONDUCTING A TEST

(75) Inventors: Mark Cadman, Surry Hills (AU);
Lazar Stankov, Wentworth Falls (AU);
Bradley Dolph, Epping (AU)

(73) Assignee: Lewis Cadman Consulting Pty Ltd., Surry Hills (AU)

( * ) Notice: Subject to any disclaimer, the term of this patent is extended or adjusted under 35 U.S.C. 154(b) by 0 days.

(21) Appl. No.: 09/700,668

(22) PCT Filed: Sep. 24, 1999

(86) PCT No.: PCT/AU99/00816
§ 371 (c)(1),
(2), (4) Date: Sep. 14, 2001

(87) PCT Pub. No.: WO00/19393
PCT Pub. Date: Apr. 6, 2000

(Under 37 CFR 1.47)

(30) Foreign Application Priority Data

Sep. 24, 1998 (AU) .............................................. PP6158

(51) Int. Cl.⁷ ................................................. G09B 7/00
(52) U.S. Cl. ........................ 434/322; 434/323; 434/350
(58) Field of Search ................................ 434/322, 323, 434/350

(56) References Cited

U.S. PATENT DOCUMENTS

| | | | |
|---|---|---|---|
| 5,180,309 A | 1/1993 | Egnor | 434/323 |
| 5,274,610 A | 12/1993 | Tonomura et al. | 368/10 |
| 5,456,607 A * | 10/1995 | Antoniak | 434/323 |
| 6,160,987 A * | 12/2000 | Ho et al. | 434/350 |
| 6,514,084 B1 * | 2/2003 | Thomas | 434/322 |

FOREIGN PATENT DOCUMENTS

GB 2242557 A 2/1991

OTHER PUBLICATIONS

Self–Confidence and Performance on Tests of Cognitive Abilities; Intelligence 25(2): 93–109.
Confidence Judgements In Studies Of Individual Differences; Person.individ.Diff. vol. 21, No. 6, pp. 971–986, 1996.

* cited by examiner

Primary Examiner—Joe H. Cheng
Assistant Examiner—John Sotomayor
(74) Attorney, Agent, or Firm—Volentine Francos, PLLC (57) ABSTRACT

There is disclosed an apparatus in the form of a personal computer (1) for conducting a test on a candidate. The computer includes a desktop unit (2) which houses a motherboard, one or more CPU's and any necessary peripheral drivers and/or network cards, none of which are explicitly shown. Computer (1) also includes first means in the form of a screen (3) for presenting a series of questions to the candidate. Also provided are second means in the form of a keyboard (4) for obtaining from the candidate an answer to each of the questions. The CPU included within computer (1) includes timer means which, in this case, is utilised for determining the time taken for the candidate to answer each of the questions.

19 Claims, 1 Drawing Sheet

APPARATUS FOR CONDUCTING A TEST

FIELD OF INVENTION

The present invention relates to testing and in particular to an apparatus for conducting a test.

The invention has been developed primarily for testing the suitability of a candidate to work in a predetermined position within an organisation and will be described hereinafter with reference to that application. However, the invention is not limited to that particular field of use and is also suitable for conducting other tests.

BACKGROUND OF THE INVENTION

Hitherto, it has been known to subject candidates applying for a position within an organisation to a written test. This testing is intended to provide the potential employer with an indication of the relative strengths and weaknesses of the candidates and whether any are well suited to the position or positions on offer.

Testing of this kind is usually in the form of one or more sets of multiple choice questions although other forms of questions are used in some tests. The questions are generally set out on a question paper which is provided to the candidates for a predetermined time. During this time the candidates must mark respective separate answer sheets with a pencil or pen to signify their choice of answer to the questions. At the end of the predetermined time the answer sheets are collected and collated for subsequent analysis. Is also known to utilise tests which are not timed.

Such testing is labour intensive and time consuming. Another major disadvantage is that the results from such tests are highly susceptible to error due to scoring mistakes by the tester. Additionally, error susceptibility easily arises should the candidate guess the answers.

DISCLOSURE OF THE INVENTION

It is an object of the present invention, at least in the preferred embodiment, to overcome or substantially ameliorate at least one of the disadvantages of the prior art, or at least to provide a useful choice.

According to a first aspect of the invention there is provided an apparatus for conducting a test on a candidate, the apparatus including:

first means for presenting a series of questions to the candidate;

second means for obtaining from the candidate an answer to each of the questions; third means for obtaining from the candidate an indication of their confidence that any one or more of the answers were correct; and timer means for determining the time taken for the candidate to answer each of the questions.

According to a second aspect of the invention there is provided an apparatus for conducting a test on a candidate, the apparatus including:

first means for presenting a series of questions to the candidate;

second means for obtaining from the candidate an answer to each of the questions;

third means for obtaining from the candidate an indication of their confidence that any one or more of the answers were correct; and timer means for determining the time taken for the candidate to answer the questions.

Preferably, the timer means determines the time taken for the candidate to answer each question.

Preferably also, the first means sequentially presents the series of questions. Even more preferably, the answers to the questions, once provided by the candidate, can not be changed.

In a preferred form, the third means allows the candidate to nominate one of a plurality of confidence bands which best corresponds with their confidence that an answer was correct. More preferably, at least some of the questions are multiple choice, wherein the number of choices being available corresponds to the number of confidence bands. In other embodiments the third means prompts the candidate to provide a number within a predetermined range to indicate their degree of confidence.

Preferably, the apparatus includes fourth means responsive to the first means, the second means and the timer means for indicating the results of the test.

According to a third aspect of the invention there is provided a method for conducting a test on a candidate, the method including the steps of:

presenting a series of questions to the candidate;

obtaining from the candidate an answer to each of the questions;

obtaining from the candidate an indication of their confidence that any one or more of the answers were correct; and determining the time taken for the candidate to answer each of the questions.

According to a fourth aspect of the invention there is provided a method for conducting a test on a candidate, the method including the steps of:

presenting a series of questions to the candidate;

obtaining from the candidate an answer to each of the questions;

obtaining from the candidate an indication of their confidence that any one or more of the answers were correct; and determining the time taken for the candidate to answer the questions.

Preferably, the method includes the step of determining the time taken for the candidate to answer each question.

Preferably also, the series of questions is sequentially presented. Even more preferably, the answers to the questions, once provided by the candidate, can not be changed.

In a preferred form, the candidate must nominate one of a plurality of confidence bands which best corresponds with their confidence that an answer was correct. More preferably, at least some of the questions are multiple choice, wherein the number of choices being available corresponds to the number of confidence bands. In other embodiments the candidate is prompted to provide a number within a predetermined range to indicate their degree of confidence.

Preferably, the method includes the step of indicating the results of the test.

BRIEF DESCRIPTION OF THE DRAWINGS

A preferred embodiment of the invention will now be described, by way of example only, with reference to the accompanying drawings and Tables, in which.

Tables 1, 2, and 3 illustrate scores achieved by candidates for Fluid Intelligence, Crystallised Intelligence and Quantitative Knowledge respectively.

Table 4 provides summary statistics for the data provided in Table 1, 2 and 3; and Table 5 provides a summary of the indicative results provided by the various tests.

PREFERRED EMBODIMENTS OF THE INVENTION

Figure 1:
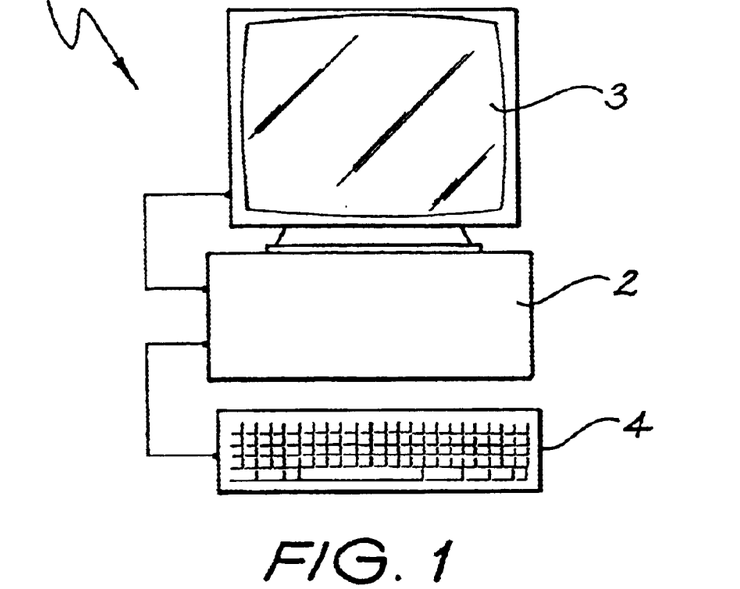
FIG. 1 is a schematic representation of an apparatus according to the invention.

Referring to FIG. 1, there is shown an apparatus in the form of a personal computer 1 for conducting a test on a candidate. The computer includes a desktop unit 2 which houses a motherboard, one or more CPU's and any necessary peripheral drivers and/or network cards, none of which are explicitly shown. Computer 1 also includes first means in the form of a screen 3 for presenting a series of questions to the candidate. Also provided are second means in the form of a keyboard 4 for obtaining from the candidate an answer to each of the questions. As would be appreciated by those skilled in the computing art, the CPU included within computer 1 includes timer means which, in this case, is utilised for determining the time taken for the candidate to answer each of the questions.

More particularly, computer 1, once initialised, sequentially displays on screen 3 a series of questions. By way of illustration these questions will be designated as $q_1, q_2, \ldots, q_n$. As a question is displayed the candidate is prompted to choose one of a plurality of answers, only one of which is correct. By way of illustration these answers will be designated as $a_1, a_2, \ldots, a_n$. The candidate effects their choice, in this embodiment, by using keyboard 4 to type a number which corresponds to the number displayed on the screen as designating the answer selected by the candidate. In other embodiments the candidate effects the choice by moving a cursor across screen 3 in response to manipulation of either keyboard 4 or a mouse (not shown). In still further embodiments use is made of a specialised input device for allowing the candidate to enter their choice. For example, a numeric keypad or a joystick.

As each question $q_1, q_2, \ldots, q_n$ is displayed and the respective answer $a_1, a_2, \ldots, a_n$ sequentially given, computer 1 calculates the respective time periods $t_1, t_2, \ldots, t_n$ which elapse. Accordingly, it is possible to determine both the total time the candidate takes to answer all questions $q_1, q_2, \ldots, q_n$, and the time taken for the candidate to answer each of those questions.

For at least some of the questions the candidate is prompted to indicate their confidence that the answer given was correct. Preferably, computer 1 prompts for such an indication for at least half of questions $q_1, q_2, \ldots, q_n$. However, in tests where there are a large number of questions computer 1 prompts for the indication of confidence less often. Preferably, the confidence indications are sought in respect of the hardest of each type of test. In this embodiment computer 1 prompts for an indication of confidence for each question $q_1, q_2, \ldots, q_n$. This leads to a plurality of confidence indicators which, for convenience, will be designated as $c_1, c_2, \ldots, c_n$. Once the candidate has answered the questions $q_1, q_2, \ldots, q_n$, computer 1 stores answers $a_1, a_2, \ldots, a_n$, time periods $t_1, t_2, \ldots, t_n$ and confidence indicators $c_1, c_2, \ldots, c_n$ in a predetermined file for subsequent processing.

More particularly, each answer is allocated a score which is weighted in accordance with a predetermined scale. In the present embodiment all the weightings are equal. In the event the answer chosen by the candidate is the correct one, then the score is allocated to the candidate. The value of all the scores allocated to the candidate are then added together to provide a total score $T_s$. In this embodiment $T_s$ is expressed as a percentage and lies within the range of 0 to 100%.

Separately, indicators $c_1, c_2, \ldots, c_n$ are processed to provide an overall indicator for confidence for that particular candidate, which will be referred to as $T_c$. In this embodiment the confidence indicators correspond to each answer and are allocated the same respective scores, in that they weighted the same as the corresponding answer. The resulting overall confidence indicator $T_c$ is expressed as a percentage and falls within the range of 0 to 100%. In other embodiments where a confidence indicator is not obtained for each answer, the overall confidence indicator $T_c$ is derived from a weighted average of the separate confidence indicators that are obtained.

In this embodiment, when obtaining an indication of the confidence of the candidate that an answer is correct, the candidate must select from one of at least three discrete confidence bands. In more preferred embodiments the candidate must select from one of at least five confidence bands. These bands are quantified in percentage terms. For example, one particular multiple choice question presents two alternatives from which to choose the answer. In this case the lowest confidence band has a lower limit of 50%, which corresponds to a guess. However, in other questions there are five alternatives from which to choose an answer, and the lowest confidence band has a lower limit of 20%, which also corresponds to a guess. In all cases the upper limit of the upper confidence band is 100%.

The total score $T_s$ for the candidate is adjusted in accordance with the overall confidence indicator $T_c$ to provide a final result or a self monitoring score $T_{sm}$ for the test. Accordingly, the $T_{sm}$ provides an indication of the level of self monitoring achieved by the candidate.

In some tests $T_{sm}$ is calculated in the following manner. First, the total score $T_s$ is expressed as a percentage of the maximum possible total score. Second, the confidence or self monitoring $T_c$ is expressed as an average percentage for each of the indications provided, whether that occurred after each question or only a selected number of questions. The final result $T_{sm}$ is then calculated in accordance with the formula:

$$T_{sm}=|T_c-T_s|$$

which lies within the range of 0 to 100%.

$T_{sm}$ is indicative of the extent to which the candidate has insight into what he or she does or does not know with respect to the questions in the test. This indication is used, in combination with $T_c$ and $T_s$ in isolation, to assist in the assessment of the candidate for either certain tasks or, if the position in question is well defined, for that position. In some circumstances it is known to predefine a range of suitable $T_{sm}$ that is appropriate for a position based upon the tasks that are needed to be carried out. In the event the test yields a $T_{sm}$ in that range the candidate is considered suitable.

Generally, a low $T_{sm}$ is favourable, although different positions have different sensitivities and acceptable ranges. For some tests and positions $T_{sm}$ in the range of 0 to 7 is considered ideal, while a $T_{sm}$ in the range of 8 to 12 is acceptable. This effect is, however, modulated by the acceptable levels specified by the organisation offering the position in question.

The apparatus and method according to the invention have been developed in conjunction with, and are particularly suited, although not limited, to carrying out tests which have been recently developed by Dr Lazar Stankov. These test are referred to as Stankov's Tests of Cognitive Abilities. The tests are designed to be short, cover a reasonably broad range of cognitive abilities and provide a maximum amount of information to the personnel selection professionals. The questions and techniques used are intended to assist in obtaining an indication of the candidate's ability to make decisions under conditions of uncertainty, their mental speed, and their mental capacity.

More particularly, Stankov's Tests of Cognitive Abilities are based upon the theory of fluid and crystallised intelligence ($G_f/G_c$ theory). This widely accepted theory states that intelligence is multi-faceted and is made up of a number of abilities which affect our performance educationally, socially and in the "world of work". The theory enunciates a number of distinct types of broad abilities and that these involve different cognitive processes, share different predictive validities and are differentially sensitive to intervention. These abilities also appear subject to different sets of learning and genetic influences. The eight broadly identified abilities are:

1. fluid ability ($G_f$);
2. crystallised ability ($G_c$);
3. broad visualisation ($G_v$);
4. broad auditory function ($G_a$);
5. short term acquisition and retrieval (SAR);
6. tertiary storage and retrieval (TSR);
7. broad speediness function ($G_s$); and
8. broad quantitative ability ($G_q$).

Stankov's Tests of Cognitive Abilities are mostly concerned with $G_f$, $G_c$ and $G_q$.

From a statistical point of view each ability is equally important. However, most work has focused on the fluid and crystallised abilities, which share important common features. For example, both are characterised by processes of perceiving relationships, logical reasoning, abstraction, concept formation, problem solving and the like. Moreover, both can be measured by timed tests or power, that is untimed, tests. The testing can take the form of material presented in any of the following: pictorial-spatial; verbal-symbolic; or verbal-semantic.

The main distinguishing feature between $G_f$ and $G_c$ is the amount of formal education and acculturation that is present either in the content of, or operations required during, the tests used to measure these abilities. It is well established that $G_f$ depends to a much smaller extent on formal education experiences than does $G_c$.

$G_f$ and $G_c$ also show distinct developmental trends during adulthood. Thus, while $G_c$ remains constant or show slight increment over the course of an individual's life span, $G_f$ generally declines as a function of age. This may largely be accounted for by the proposed mechanisms underlying the $G_f/G_c$ distinction. While $G_f$ is thought to depend on the capacity of working memory, $G_c$ is thought to depend on the long-term memory store and the organisation of information within that store. Working memory deteriorates with age as a function of neurological decay, while long term store is less prone to such effects.

According to $G_f/G_c$ theory, the presence of broad abilities other than $G_f$ and $G_c$ indicates that performance on all cognitive tasks depends not only on "higher" mental processes, but also on processes that have been viewed as "lower" level functions in more traditional theories of intelligence. For example, the existence of $G_a$ and $G_v$ indicates that some people are more efficient at processing information that is auditory in nature, whilst others are more efficient at processing information acquired through the visual medium.

The theory is discussed in more detail in the following references, the disclosure of which is incorporated herein by way of cross reference:

Carroll, J. B. (1913). *Human Cognitive Abilities: A Survey of Factor-Analytic Studies*. New York: Cambridge University Press; and Horn, J. L., & Noll, J. (1994). A system for understanding cognitive capabilities: A theory and the evidence on which it is based. In D. K. Detterman, (Ed), *Current Topics in Human Intelligence: Volume IV: Theories of Intelligence*. Norwood, N.J. : Ablex Publishing Corporation.

Stankov's Tests of Cognitive Abilities include a battery of tests for measuring three broad ability factors that are deemed essential for successful performance in a wide variety of contemporary working environments. These are:

1. Fluid intelligence (Gf). This is measured by two tests:
   a. Swaps test;
   b. Triplets test;

Both these tests have good psychometric properties and embody sound principles from experimental cognitive psychology. They will be described in more detail below.

2. Crystallised intelligence (Gc). This is measured by two tests:
   c. Vocabulary test;
   d. Proverbs Matching test;

The Vocabulary test is a common synonyms vocabulary test. The Proverbs test requires the examinee to match two proverbs according to their meaning or their relevant message.

3. Broad quantitative ability (Gq). This is measured by two tests:
   e. Numerical Operations;
   f. Financial Reasoning.

The Numerical Operations test is a common measure of the facility to carry out elementary arithmetic operations. The Financial Reasoning test is developed for and is most suitable to part of a selection battery for the entry-level jobs in financial institutions.

It is possible to classify the above six tests with respect to subjective difficulty. In the listing, the first test in each group is usually seen as somewhat easier than the second.

Stankov's Tests of Cognitive Abilities contain three features that have not been a part of most previous selection batteries. These are:

1. Systematic Measurement of Complexity and Difficulty in Tests of Fluid Abilities An important aspect of good tests of fluid abilities is the existence of items that systematically vary in difficulty. This allows for a fine discrimination among individuals along the relevant dimension. In the past, this gradation was accomplished by selecting items in the post-hoc way, that is, after piloting the test and during the process of item analysis. The tests of the present battery consist of items that are selected a priory after the analysis of cognitive processes that are called upon during the solution process. This increase in difficulty is directly related to demands placed on important capacity constructs like working memory and attentional resources. Thus, the Swap items that require one swap are easier than items that require more than one swap and a similar increase in difficulty is present in the Triplets test. Laboratory studies have shown that systematic increase in difficulty is supported by the data.

Furthermore, the increased item difficulty is also characterised by an increase in the tests' correlations with traditional tests of intelligence. In other words, they also increase in complexity. This increase in correlation is not a necessary feature of the increase in difficulty—in most tests of intelligence easy items have the same correlation with the IQ scores as do the difficult items. For that reason, the present tests have an advantage over the older tests—they can measure a wide range of difficulty and, at the hardest level, the items are improved measures of fluid abilities for theoretically important reasons. On the applied side, we now know that these two tests are useful assessment devices during the different stages of recovery from brain injury.

2. Measurement of Speed of Test-taking

Much of the recent work on intelligence is directed at establishing the empirical link between fluid intelligence and speed of mental operations. It is important to keep in mind the fact that speed is not a unitary construct—there are several types of mental speed and each one of these may have different relationship to intelligence. While the measurement of mental speed is important from both theoretical and practical points of view, it is wrong to see mental speed as the basic process of intelligence. The present battery measures one of the mental speed constructs—the speed of test-taking.

From the practical viewpoint, the information on the speed of test-taking may be useful for the selection of personnel for jobs requiring a quick decision under time pressure. It is also useful to compare people with respect to speed-accuracy trade-off that is, are those who are quick also prone to committing more errors. Finally, it is also known that speed of mental processing is closely linked to the age-related cognitive changes in the human organism. Older people are considerably slower than young. However, there are significant individual differences in the aging process. The information about the speed of test taking may be useful in selecting older people who have retained the speed characteristic of the younger members of the population.

3. Measurement of Self-confidence and Self-monitoring

Three tests in this battery provide information about the self-confidence in the answers provided to test items. This work derives from research on decision making under conditions of uncertainty. Confidence rating scores on their own provide an indication about the ego-related personality trait of self-confidence which is located somewhere on the borderline between personality and intelligence. In many situations, the accuracy of one's assessment of the situation is not the only or even the most important information that directs action. Confidence in that judgement may be the critical feature. Furthermore, the difference between accuracy scores and confidence that are provided in the report section tell us how good we are in knowing what we know and what we do not know. This difference or bias is the information about self-monitoring. Some people have good insight into their own performance while others show a pronounced bias.

It can be expected that people with high self-confidence tend to be "managerial material" in organisations. They should show more initiative and, in general, provide leadership in team work.

The design of this battery of tests was guided by the following considerations:

a. Relatively quick assessment of cognitive abilities. On average a respondent should be able to complete each test within ten minutes.

b. Reliable for a wide range of jobs.

Overall, the tests of this battery represent a sample of abilities that are captured by the general factor and contain considerably more information than what can be easily obtained from known tests.

Each of the individual tests in Stankov's Tests of Cognitive Abilities are performed through use of the invention. That is, the tests are embodied in a computer program which, once initialised, runs on computer 1. The candidate is sequentially presented with a series of questions from one or more of the Stankov's Tests and prompted to select an answer. The Swaps test involves displaying on screen 3 an array of at least three linearly spaced apart visually distinct figures or pictures, as well as a set of instructions. The instructions ask the candidate to carry out a mental swap of the figures and to prompt the computer once they wish to provide an answer. Once so prompted, the instructions and array are no longer displayed, but rather a number of alternative arrays are shown with different relative positioning of the pictures. The candidate must them select one of the alternative provided. Once this answer is provided computer 1 displays the next question. Generally, one or both of the number of pictures and the complexity of the instructions progressively increases for subsequent questions.

In this particular embodiment each array in the different questions includes three pictures.

The time taken for the candidate to review and answer each question is measured by computer 1. Moreover, in this embodiment computer 1, after each question, asks the candidate to indicate their level of confidence that the answer was correct. In other embodiment the level of confidence is not measured for the Swaps test.

Once the Swaps test is completed, computer 1 automatically progresses to the Triplets test. The input provided by the candidate to computer 1 during the Swaps and Triplets test are compiled and processed to give the following:

Swaps Accuracy (%)=the number of correct answers divided by the total number of questions;

Swaps Reaction Time (seconds)=the sum of the time taken to answer each question, divided by the total number of questions;

Triplets Accuracy (%)=the number of correct answers divided by the number of questions;

Triplets Reaction Time (seconds)=the sum of the time taken to answer each of the questions, divided by the total number of questions;

Triplets Self Confidence (%)=the sum of the confidence ratings for each question attempted divided by the total number of questions; and Triplets Self Monitoring (%)=Triplets Self Confidence minus Triplets Accuracy.

Once the Triplets test is completed computer 1 progresses to the additional tests to gain indicators to Crystallised Intelligence. The input provided by the candidate to during these tests are compiled and processed to give the following:

Vocabulary Accuracy (%)=the number of correct answers divided by the total number of questions in the test;

Vocabulary Reaction Time (seconds)=the sum of the time taken to answer each of the questions, divided by the total number of questions;

Proverbs Matching Accuracy (%)=the number of correct answers divided by the total number of questions in the test;

Proverbs Matching Reaction Time (seconds)=the sum of the time taken to answer each question, divided by the total number of questions;

Proverbs Matching Self Confidence (%)=the sum of the confidence ratings for each question attempted divided by the number of questions attempted; and Proverbs Matching Self Monitoring (%)=Proverbs Matching self confidence minus Proverbs Matching Accuracy.

Computer 1 then progresses to the final tests to gain indicators to Quantitative Knowledge. The input provided by the candidate during these tests are compiled and processed to give the following:

Numerical Operations Accuracy (%)=the number of correct answers divided by the total number of questions in the test;

Numerical Operations Reaction Time (seconds)=the sum of the time taken to answer each question, divided by the total number of questions;

Financial Reasoning Accuracy (%)=the number of correct answers divided by the total number of questions in the test;

Financial Reasoning Reaction Time (seconds)=the sum of the time taken to answer each question, divided by the total number of questions;

Financial Reasoning Self Confidence (%)=the sum of the confidence ratings for each answer divided by the number of questions; and Financial Reasoning Self Monitoring (%)=Financial Reasoning Self Confidence minus Financial Reasoning Accuracy.

Once all the tests are completed computer 1 produces summary statistics for the candidate which, in this embodiment, include the following:

Fluid Intelligence (percentage correct)=the sum of the accuracy scores for Swaps and Triplets, divided by two (2);

Crystallised Intelligence (percentage correct)=the sum of the accuracy scores for Vocabulary and Proverb Matching, divided by two (2);

Quantitative Knowledge (percentage correct)=the sum of the accuracy scores for Numerical Operations and Financial Reasoning, divided by two (2);

Speed (seconds)=the sum of the speed scores for all tests divided by six (6);

Overall Self Confidence (%)=the sum of all Confidence Ratings for Triplets, Proverbs Matching and Financial Reasoning, divided by three (3); and Overall Self Monitoring (%)=overall self confidence for Triplets, Proverbs Matching and Financial Reasoning minus the overall accuracy for the same three tests.

The results provided by computer 1 can be represented in tabular, graphical or other forms. Examples of such results for candidates c, d, e and f are provided in Tables 1, 2, 3 and 4. In this embodiment the tabulated results are not displayed to the candidate. In other embodiments some or all of the data is so displayed.

Reference is also made to Table 5 which sets provides a brief explanation of the indications provided by the various tests outlined above.

The invention, through the use of time measurement, self confidence ratings and a derivation of a measure of self monitoring, allows the assessor to gain a greater insight into cognitive ability of the candidate. Unlike the prior art systems, reliance need not be placed only upon the number of correct answers and the total time taken to conduct a test.

Figure 2:
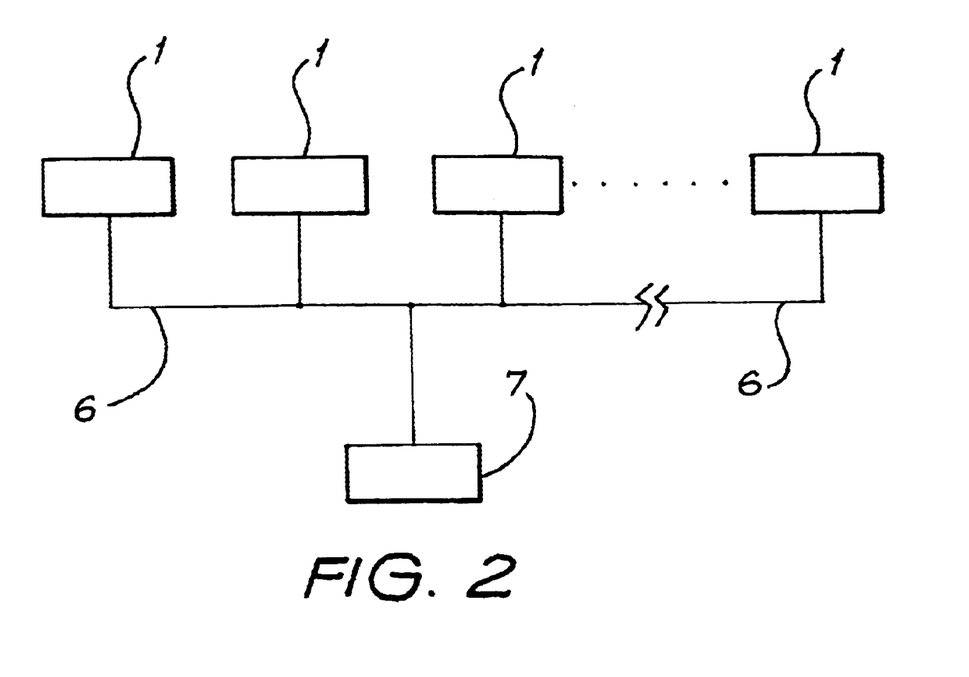
FIG. 2 is a schematic representation of a number of like apparatus interconnected to allow simultaneous testing of a number of candidates.

In some embodiments, and as illustrated in FIG. 2, a plurality of like computers 1 are interconnected in a LAN to allow simultaneous testing of a plurality of candidates. In the configuration shown, computers 1 are interconnected by cabling 6 and centrally controlled by a server 7.

Although the invention has been described with reference to a specific example, it will be appreciated by those skilled in the art that it may be embodied in many other forms. For example, the results, in some embodiments, are expressed both in relative and absolute terms. That is, not only are the actual results of the test for each candidate provided, but how that candidate performed relative to other candidates who underwent the same test.

TABLE 1

FLUID INTELLIGENCE

| Name | Swaps Accuracy | Swaps Reaction | Triplets Accuracy | Triplets Reaction | Triplets Self-Confidence | Triplets Self-Monitoring |
|---|---|---|---|---|---|---|
| c | 56% | 17.66 sec | 89% | 2.95 sec | 95% | 6% |
| d | 28% | 15.84 sec | 94% | 3.36 sec | 67% | -27% |
| b | 18% | 24.24 sec | 83% | 6.67 sec | 66% | -17% |
| e | 18% | 10.66 sec | 87% | 3.74 sec | 99% | -12% |
| a | 62% | 16.30 sec | 90% | 3.40 sec | 67% | -23% |
| f | 15% | 17.07 sec | 25% | 5.43 sec | 72% | 47% |
| Norm Average | 38% | 16.9 sec | 4.0 sec | 4.0 sec | 95% | 8% |

TABLE 2

CRYSTALLISED INTELLIGENCE

| Name | Vocabulary Accuracy | Vocabulary Reaction | Proverbs Accuracy | Proverbs Reaction | Proverbs Self-Confidence | Proverbs Self-Monitoring |
|---|---|---|---|---|---|---|
| c | 80% | 5.92 sec | 60% | 23.66 sec | 60% | 0% |
| d | 90% | 7.26 sec | 20% | 29.53 sec | 43% | 23% |
| b | 60% | 18.32 sec | 25% | 30.53 sec | 42% | 17% |
| e | 93% | 4.20 sec | 65% | | 98% | 33% |
| a | 73% | 9.51 sec | 45% | 27.53 sec | 81% | 36% |
| f | 23% | 7.32 sec | 25% | 10.77 sec | 70% | 45% |

TABLE 2-continued

CRYSTALLISED INTELLIGENCE

| Name | Vocabulary Accuracy | Vocabulary Reaction | Proverbs Accuracy | Proverbs Reaction | Proverbs Self-Confidence | Proverbs Self-Monitoring |
|---|---|---|---|---|---|---|
| Norm Average | 69% | 9.7 sec | 39% | 22.1 sec | 55% | 10% |

TABLE 3

QUANTITATIVE KNOWLEDGE

| Name | Numerical Accuracy | Numerical Reaction | Financial Accuracy | Financial Reaction | Financial Self-Confidence | Financial Self-Monitoring |
|---|---|---|---|---|---|---|
| c | 82% | 11.01 sec | 25% | 41.24 sec | | |
| d | 36% | 11.48 sec | 16% | 53.54 sec | | |
| b | 62% | 11.33 sec | 0% | 61.65 sec | 7% | 7% |
| e | 70% | 11.11 sec | 25% | 51.38 sec | 42% | 17% |
| a | 82% | 11.07 sec | 58% | 48.98 sec | 83% | 25% |
| f | 14% | 11.75 sec | 8% | 35.16 sec | 68% | 60% |
| Norm Average | 57% | 15.3 sec | 29% | 45.8 sec | 53% | 30% |

TABLE 4

SUMMARY STATISTICS

| Name | Fluid Gf | Crystallised Gc | Quantitative Gq | Speed Gs | Overall Self-Confidence | Overall Self-Monitoring |
|---|---|---|---|---|---|---|
| c | 73% | 70% | 54% | 17.07 sec | | |
| d | 61% | 55% | 26% | 20.17 sec | | |
| b | 51% | 43% | 31% | 25.46 sec | 38% | 2% |
| e | 53% | 79% | 48% | | 80% | 21% |
| a | 76% | 59% | 70% | 19.47 sec | 77% | 13% |
| f | 20% | 24% | 11% | 14.58 sec | 70% | 51% |
| Norm Average | 59% | 54% | 43% | 18.7 sec | 67% | 9% |

TABLE 5

| TEST NAME | SCORE | EXPLANATION/COMMENTS |
|---|---|---|
| SWAPS ACCURACY | HIGH 80% | Indicates above average ability to hold in mind several bits of information and manipulate elements of the task in working memory |
| | AVERAGE LOW 20% | Indicates below average ability to hold in mind several bits of information and manipulate elements of the task in working memory |
| SWAPS REACTION TIME | HIGH 80%+ | Fast thinker - above average speed of manipulating elements while holding several bits of information in working memory |
| | AVERAGE LOW 20%− | Slow thinker - below average speed of manipulating elements while holding several bits of information in working memory. |
| TRIPLETS ACCURACY | HIGH 80% | Indicates above average ability to keep in mind a rule for doing a particular mental operation and examine the problem in order to establish if the rule is satisfied. |
| | AVERAGE LOW 20% | Indicates below average ability to keep in mind a rule for doing a particular mental operation and examine the problem in order to establish if the rule is satisfied. |
| TRIPLETS REACTION TIME | HIGH | Fast thinker - above average speed when there is a need to keep in mind a rule for doing a particular mental operation and examine the problem in order to establish if the rule is satisfied. |
| | AVERAGE LOW | Slow thinker - below average speed when there is a need to keep in mind a rule for doing a particular mental operation |

TABLE 5-continued

| TEST NAME | SCORE | EXPLANATION/COMMENTS |
|---|---|---|
| | | and examine the problem in order to establish if the rule is satisfied. |
| TRIPLETS SELF CONFIDENCE | HIGH 80% | Above average belief in one's ability to keep in mind a rule for doing a particular mental operation and examine the problem in order to establish if the rule is satisfied |
| | AVERAGE LOW 20% | Above average belief in one's ability to keep in mind a rule for doing a particular mental operation and examine the problem in order to establish if the rule is satisfied. |
| TRIPLETS SELF MONITORING | HIGHER THAN 10% | Relatively poor ability to monitor one's performance in tasks requiring the ability to keep in mind a rule for doing a particular mental operation and examine the problem in order to establish if the rule is satisfied |
| | 10% | Satisfactory ability to monitor one's performance in tasks requiring the ability to keep in mind a rule for doing a particular mental operation and examine the problem in order to establish if the rule is satisfied. |
| VOCABULARY ACCURACY | HIGH 80%+ | Indicates a good understanding of word meanings |
| | AVERAGE LOW 20%− | Indicates poor understanding of word meanings |
| VOCABULARY REACTION TIME | HIGH 80%+ | Indicates speed of retrieving and applying acquired (stored) knowledge. |
| | AVERAGE LOW 20%− | Indicates slow speed of retrieving and applying acquired (stored) knowledge |
| PROVERBS MATCHING ACCURACY | HIGH 80% | Strong ability to understand word meanings at an advanced level, to understand the meanings conveyed by proverbs, and match two proverbs according to their meaning |
| | AVERAGE LOW 20% | Poor ability to understand word meanings at an advanced level, to understand the meanings conveyed by proverbs, and match two proverbs according to their meaning. |
| PROVERBS MATCHING REACTION TIME | HIGH 80% | Fast thinker - quick to understand word meanings at an advanced level, to understand the meanings conveyed by proverbs, and match two proverbs according to their meaning. |
| | AVERAGE LOW 20%− | Slow thinker - slow to understand word meanings at an advanced level, to understand the meanings conveyed by proverbs, and match two proverbs according to their meaning. |
| PROVERBS MATCHING SELF CONFIDENCE | HIGH 80%+ | Above average belief in one's ability to know that the decisions regarding the meanings of proverbs are correct or incorrect |
| | AVERAGE LOW 20%− | Below average belief in one's ability to know that the decisions regarding the meanings of proverbs are correct or incorrect |
| PROVERBS MATCHING SELF MONITORING | HIGHER THAN 10% | Relatively poor ability to monitor one's performance regarding the meanings of proverbs |
| | AVERAGE 1–10% | Indicates an accurate perception of the quality of answers given. A realistic awareness of the ability to monitor one's performance regarding the meanings of proverbs |
| NUMERICAL OPERATIONS ACCURACY | HIGH 80% | Indicates strong ability to solve basic mathematical problems |
| | AVERAGE LOW 20% | Indicates poor ability to solve basic mathematical problems. |
| NUMERICAL OPERATIONS ACCURACY REACTION TIME | HIGH 80% | Fast thinker - high speed of solving basic mathematical problems. |
| | AVERAGE LOW 20% | Slow thinker - slow speed of solving basic mathematical problems |
| FINANCIAL REASONING ACCURACY | HIGH 80% | Indicates strong ability to reason with problems of financial and mathematical nature |
| | AVERAGE LOW 20% | Indicates poor ability to reason with problems of financial and mathematical nature |
| FINANCIAL | HIGH | Fast thinker - above average speed of reasoning with |

TABLE 5-continued

| TEST NAME | SCORE | EXPLANATION/COMMENTS |
|---|---|---|
| REASONING REACTION TIME | 80%+ | problems of financial and mathematical nature. |
| | AVERAGE | |
| | LOW 20%− | Slow thinker - below average speed of reasoning with problems of financial and mathematical nature |
| FINANCIAL REASONING SELF CONFIDENCE | HIGH 80% | Above average belief in one's ability reason with problems of financial and mathematical nature |
| | AVERAGE | |
| | LOW 20% | Below average belief in one's ability reason with problems of financial and mathematical nature |
| FINANCIAL REASONING SELF MONITORING | HIGHER THAN 10% | Relatively high ability to monitor one's performance in tasks that require reasoning with financial and mathematical problems. |
| | 0–10% | Relatively poor ability to monitor one's performance in tasks that require reasoning with financial and mathematical problems |
| FLUID INTELLIGENCE | HIGH 80% | Indicates above average learning potential. Strong ability to solve novel problems. Strong ability to solve problems which are predominantly unrelated to past education. Suggests that the individual is highly competent at carrying out such processes as perceiving relationships, logical reasoning and problem solving with nonverbal material. Indicate advanced working memory capacity (ability to mentally hold and organise information to solve problems), and the amount of attentional resources (focus mental energy to solve tasks). |
| | AVERAGE | |
| | LOW 20% | Indicates difficulty in learning new tasks. Relatively poor ability to solve novel problems and difficulty in solving problems which are unrelated to past education. Suggests that the individual struggles at carrying out such processes as perceiving relationships, logical reasoning and problem solving with nonverbal material. Indicates below average working memory capacity (ability to mentally gather and organise information to solve problems) and the amount of attentional resources (focusing mental energy to solve tasks). |

What is claimed is:

1. An apparatus for conducting a test on a candidate, the apparatus comprising:
   first means for presenting a series of questions to the candidate;
   second means for obtaining from the candidate an answer to each of the questions;
   third means for obtaining from the candidate an indication of their confidence by allowing the candidate to nominate one of a plurality of confidence bands which best corresponds with their confidence that any one or more of the answers were correct; and
   a timer which measures the time taken for the candidate to answer the questions.

2. The apparatus according to claim 1, wherein the timer measures the time taken for the candidate to answer each of the questions.

3. The apparatus according to claim 1, wherein the third means obtains a confidence indication for each of the questions.

4. The apparatus according to claim 2 wherein, once all the answers have been obtained form the candidate, the third means provides an overall confidence indicator for that candidate.

5. The apparatus according to claim 4, wherein the third means derives the confidence indicator from the indication of confidence provided by the candidate.

6. The apparatus according to claim 5, wherein the third means derives the confidence indicator from selected ones of the indications of confidence provided by the candidate.

7. The apparatus according to claim 5, wherein the third means obtains from the candidate an indication of their confidence that selected ones of the answers are correct, where that selected number is less than the number of questions presented to the candidate.

8. The apparatus according to claim 1, wherein the first means sequentially presents the series of questions.

9. The apparatus according to claim 1, wherein answers to the questions, once provided by the candidate, can not be changed.

10. The apparatus according to claim 1 wherein at least some of the questions are multiple choice, a number of choices being available corresponding to the number of confidence bands.

11. The apparatus according to claim 1 wherein the third means prompts the candidate to provide a number within a predetermined range to indicate their degree of confidence.

12. The apparatus according to claim 1 including fourth means responsive to the first means, the second means and the timer for indicating the results of the test.

13. A method for conducting a test on a candidate, the method comprising:
   presenting a series of questions to the candidate;
   obtaining from the candidate an answer to each of the questions;
   obtaining from the candidate an indication of their confidence by allowing the candidate to nominate one of a plurality of confidence bands which best corresponds with their confidence that any one or more of the answers were correct; and determining time taken for the candidate to answer the questions.

14. The method according to claim 13, further comprising determining the time taken for the candidate to answer each question.

15. The method according to claim 13 wherein the series of questions is sequentially presented.

16. The method according to claim 13 wherein the answers to the questions, once provided by the candidate, can not be changed.

17. The method according to claim 13 wherein at least some of the questions are multiple choice, wherein the number of choices being available corresponds to the number of confidence bands.

18. The method according to claim 13 further comprising prompting the candidate to provide a number within a predetermined range to indicate their degree of confidence.

19. The method according to claim 13, further comprising indicating the results of the test.

* * * * *